United States Patent
Seyrat et al.

(10) Patent No.: US 7,275,060 B2
(45) Date of Patent: Sep. 25, 2007

(54) METHOD FOR DIVIDING STRUCTURED DOCUMENTS INTO SEVERAL PARTS

(75) Inventors: Claude Seyrat, Paris (FR); Cedric Thienot, Paris (FR)

(73) Assignee: Expway, Reims (FR)

( * ) Notice: Subject to any disclaimer, the term of this patent is extended or adjusted under 35 U.S.C. 154(b) by 223 days.

(21) Appl. No.: 10/451,473

(22) PCT Filed: Dec. 14, 2001

(86) PCT No.: PCT/FR01/04008

§ 371 (c)(1),
(2), (4) Date: Oct. 8, 2003

(87) PCT Pub. No.: WO02/50708

PCT Pub. Date: Jun. 27, 2002

(65) Prior Publication Data

US 2004/0054669 A1    Mar. 18, 2004

(30) Foreign Application Priority Data

Dec. 18, 2000  (FR)  .................................. 00 16507

(51) Int. Cl.
*G06F 7/00*  (2006.01)
*G06F 17/00*  (2006.01)
*G06F 17/30*  (2006.01)
*G06F 15/16*  (2006.01)

(52) U.S. Cl. .................. 707/101; 707/10; 707/100; 709/231

(58) Field of Classification Search .............. 707/101; 370/412, 413; 710/107
See application file for complete search history.

(56) References Cited

U.S. PATENT DOCUMENTS 5,142,689 A * 8/1992 Eisenack ..................... 710/107

(Continued)

FOREIGN PATENT DOCUMENTS

EP    0 928 070    7/1999

(Continued)

OTHER PUBLICATIONS

Microsoft Computer Dictionary, Peter Aiken et al, 2002, Microsoft Press, Fifth Edition, p. 216.*

(Continued)

*Primary Examiner*—Don Wong
*Assistant Examiner*—Patrick A. Darno
(74) *Attorney, Agent, or Firm*—Collard & Roe, P.C.

(57) ABSTRACT

The method applies to a structured document presenting a hierarchical structure defined by a structure schema, the document combining a main structured set of information including information subsets at least some of the information subsets being structured and being capable of including information subsets of lower hierarchical level, each information subset being associated in the higher level information set with a respective information type. The method includes: dividing the document into structured portions capable of being handled individually, namely a main portion and at least one secondary portion, the main portion containing at least the main set of information, and the secondary portion containing an information subset which is removed from the main set of information, each secondary portion being attached to the main portion or to another secondary portion; and allocating a predefined value to the information type of each information subset that has been removed from an information set of higher hierarchical level.

18 Claims, 1 Drawing Sheet

U.S. PATENT DOCUMENTS 6,119,123 A    9/2000  Elenbaas et al.
6,304,578 B1 * 10/2001 Fluss ........................ 370/413
6,370,536 B1 *  4/2002 Suzuki et al. ............... 707/101

FOREIGN PATENT DOCUMENTS

JP          2000-83059       3/2000
WO          WO97 34240       9/1997

OTHER PUBLICATIONS

Liefke He et al: "XMILL: An Efficient Compressor for XML Data"• Sigmod Record, Association for Computer Machinery, New York, U.S. vol. 29, No. 2, Jun. 2000 pp. 153-164 XP 001002286.

* cited by examiner

METHOD FOR DIVIDING STRUCTURED DOCUMENTS INTO SEVERAL PARTS

CROSS REFERENCE TO RELATED APPLICATIONS

Applicants claim priority under 35 U.S.C. §119 of French Application No. 00/16507 filed on 18 Dec. 2000. Applicants also claim priority under 35 U.S.C. §365 of PCT/FR01/04008 filed on 14 Dec. 2001. The international application under PCT article 21(2) was not published in English.

BACKGROUND OF THE INVENTION

1. Field of the Invention

The present invention relates to a method enabling structured documents to be divided into several parts.

It applies particularly but not exclusively to handling, transmitting, storing, and reading structured multimedia documents, digital or video images or image sequences, movies or video programs, and more generally to any transfer of said documents between processor units interconnected by data transmission networks, or between a processor unit and a storage unit, or indeed between a processor unit and a playback unit such as a television set if the document is a video program.

2. Description of the Related Art

More and more frequently, documents handled and transmitted in this way contain a plurality of different types of data integrated in a structure. A structured document is a connection of data sets each associated with a type and attributes, and interconnected by relationships that are mainly hierarchical. Such documents use a markup language such as Standard Generalized Markup Language (SGML), Hypertext Markup Language (HTML), or Extensible Markup Language (XML), serving in particular to distinguish between the various subsets of information making up the document. In contrast, in a "linear" document, the content information of the document is mixed in with layout information and type information.

A structured document includes markers for separating different sets of information in the document. For SGML, XML, or HTML formats, these markers are referred to as "tags" and have the form "<XXXX>" and "</XXXX>", the first marker marking the beginning of a set of information called "XXXX", and the second marking the end of said set. A set of information may itself be made up of a plurality of lower-level sets of information. Thus, a structured document presents a tree or hierarchical structure schema, each node representing a set of information and being connected to a node at a higher hierarchical level representing a set of information that contains the sets of information at lower level. The nodes situated at the ends of branches in such a tree structure represent sets of information containing data of predetermined type, themselves not suitable for being resolved into subsets of information.

Thus, a structured document contains separation markers represented in textual or binary data form, said markers defining information sets or subsets that can themselves contain other subsets of information defined by the markers.

A structured document is associated with a structure schema defining the structure in the form of rules together with the type of information in each set of information of the document. A schema is constituted by nested groups of information set structures, these groups possibly being ordered sequences, groups of alternative elements, or groups of necessary elements, ordered or not ordered.

At present, when a structured document is to be transmitted, it is initially compressed so as to minimize the volume of data to be transmitted. For best efficiency in such compression processing, the document structuring data is also compressed, given that the recipient of the document is assumed to know beforehand the structure schema of the document and to be able to use the structure schema to determine at all times what information set is about to be received. It is therefore essential for the structure of the document as transmitted to correspond exactly to the structure schema that the recipient of the document intends to use for receiving and decoding the document, since otherwise the recipient cannot determine the type of data that has been transmitted and is thus incapable of decoding the data and of reconstituting the original document.

Unfortunately, structured documents for transmission are tending to become more and more voluminous. Proposals have been made, for example, to transmit or broadcast complete descriptions of movies or TV programs in this way.

In this context, if a transmission error should occur while a document is being transmitted, the recipient of the document may no longer be able to determine which subset is being transmitted, in which case the entire document needs to be transmitted again. Furthermore, if it is desired to transmit a movie sequence and display it simultaneously on a screen, it can be necessary to comply with periods of time for transmitting the various elements of the sequence. Certain elements of the sequence must also be capable of being transmitted several times over so as to enable a recipient who was not connected at the beginning of the transmission of the sequence to receive and display the end of the sequence.

It may also be necessary to replace a portion of a document by another, these two portions having the same structure schema.

The solution which consists in retransmitting the entire document leads to a considerable increase in the volume of information that needs to be transmitted. It is therefore desirable to be able to divide a document into a plurality of portions which are transmitted separately. It turns out that present transmission methods are not suitable for transmitting a document in part only.

SUMMARY OF THE INVENTION

An object of the invention is to overcome that drawback. This object is achieved by providing a method of dividing a structured document presenting a hierarchical structure defined by a structure schema, the document combining a main set of information including information subsets, at least some of the information subsets being capable of including information subsets of lower hierarchical level, each information subset being associated with a respective information type.

According to the invention, the method comprises the steps of:

dividing the document into portions that can be handled separately, namely a main portion and at least one secondary portion, the main portion containing at least the main set of information, and the secondary portion containing an information subset which is removed from the main set of information, each secondary portion being attached to the main portion or to another secondary portion; and allocating a predefined value to the information type of each information subset that has been removed from a higher level information set.

In this way, each portion is understandable on its own and can be decoded regardless of the selected partitioning. In addition, when such a portion is transmitted and the transmission fails, the remainder of the document remains valid and only the portion that was not transmitted correctly needs to be retransmitted, there being no need to retransmit the entire document. Furthermore, there is no need to have main portions and secondary portions upstream from a portion in order to be able to decode that portion, since each portion is valid and comprehensible on its own. By means of these dispositions, a transmitted document can be enriched and modified as time progresses.

Advantageously, the document includes a header which is inserted in each portion, the header including a flag whose value specifies whether or not the document is complete.

According to a feature of the invention, each portion has a header containing information giving the location of the portion in the hierarchical structure of the document.

Said information concerning the location of the secondary portion in the hierarchical structure of the document advantageously describes a path in said structure, defining the position of the secondary portion in the document.

Said path may be defined in absolute manner relative to the main set of information of the document. It may also be defined in relative manner relative to the position of a most recently-transmitted secondary portion.

Alternatively, each type of information allocated to the predefined value is followed by a reference to the secondary portion containing the subset of information associated with the type of information, said information concerning the location of the secondary portion in the hierarchical structure of the document being the reference of said secondary portion.

The method may also include transmitting a plurality of document portions associated with the same location in the structure. Under such circumstances, the most recently-transmitted portion replaces the previous portion that was associated with the same location.

Provision may also be made for the header of each portion to contain information specifying a way of processing the portion relative to a portion associated with the same location in the structure.

The structured document may be of the SGML, XML, or HTML type, for example.

BRIEF DESCRIPTION OF THE DRAWINGS

A preferred embodiment of the invention is described below by way of non-limiting examples and with reference to the accompanying drawing, in which.

DESCRIPTION OF PREFERRED EMBODIMENTS

Figure 1:
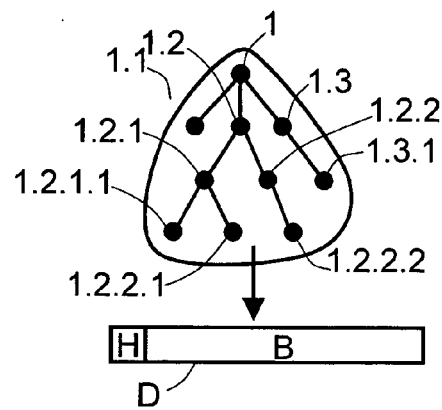
FIG. 1 shows a tree structure in which each node symbolizes a set or a subset of information in a structured document which is normally transmitted as a single entity.

FIG. 1 shows a tree structure comprising a root node 1 partitioned into three lower level nodes, of which a first node 1.1 is not partitioned into lower level nodes, a second node 1.2 comprises two nodes 1.2.1 and 1.2.2, and a third node 1.3 comprises a single node 1.3.1. The two nodes 1.2.1 and 1.2.2 of the second node 1.2 are respectively attached to one 1.2.1.1 and to two nodes 1.2.2.1 and 1.2.2.2 of lower level.

This structure represents a structured document D comprising a header H in which a certain number of parameters are defined that define the coding and display format of the document, and a main body B containing the information and the sets of information constituting the document.

Figure 2:
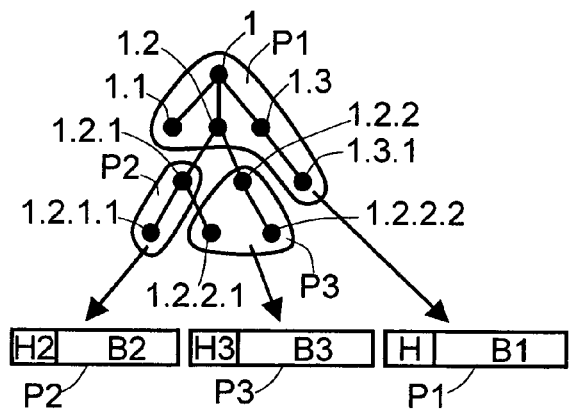
FIG. 2 shows the structured document of FIG. 1 partitioned into a plurality of portions, each capable of being transmitted separately in accordance with the invention.

According to the invention, a structured document can be transmitted as a plurality of separate portions P1, P2, P3, i.e. a main portion, and secondary portions P2 and P3 which are attached to the main portion (FIG. 2). Such transmission is preferably performed after each portion for separate transmission has been compressed in appropriate manner. Each portion of the document, whether or not it is compressed, comprises a header H, H2, H3, and a main body B1, B2, B3.

Figure 3:
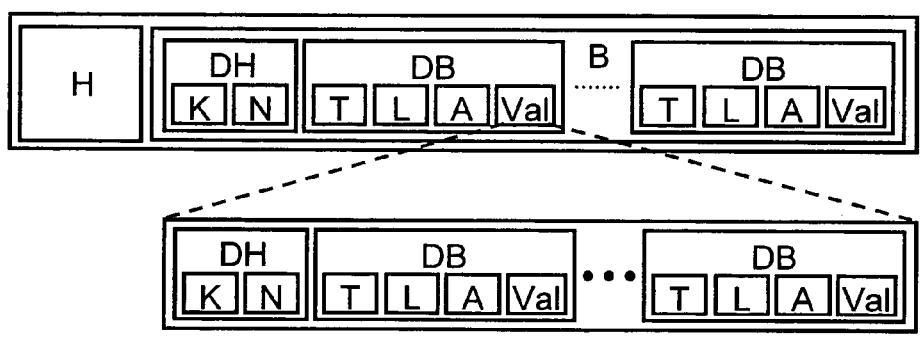
FIG. 3 shows in greater detail the structure of the information contained in a structured document.

As shown in FIG. 3, a main body B of the document comprises a data header DH and one or more data bodies DB each containing the information of an information subset of the document. The data header DH may have a field K enabling ambiguity to be resolved at the time the document is decoded, in particular by giving a number enabling the following data set to be defined, and/or a field containing the number N of occurrences of the data body DB.

Depending on the format used, each data body DB may comprise a field T specifying the type of information it contains, a field L giving length of the information as a number of bits or of bytes, a field A containing the attributes of the information subsets, and a field Val containing the value or the content of the information subsets.

Since the document is structured in the form of a tree structure, the field Val may itself contain a data header field DH and one or more fields containing a data body DB.

On this topic, it should be observed that in the structure schema shown in FIG. 1, the information contained in the document is held in the nodes 1.1, 1.2.1.1, 1.2.2.1, 1.2.2.2, and 1.3.1 situated at the ends of the branches, and also in the attribute fields A of the subsets symbolized by all of the nodes of the document.

According to the invention, when it is desired to transmit a part of such a document, and regardless of whether it has been previously been compressed, the field T containing the type of the information in a data body DB that has not been transmitted or that has been withdrawn from the document receives a predefined value specifying that the following information subset is not transmitted. This predefined particular value for information type is selected to be equal to zero, for example, when a document is in compressed form, with other types of information having values that are not zero.

If this predefined value appears in the transmitted document, the length field L and the fields A and Val which normally follow the information type do not appear in the transmitted data. Consequently, following an information type that is equal to the predefined value, there is the header DH of the next set of data in the document, or an end-of-document flag.

Provision can be made to add a parameter to the document header H to specify whether or not the document is transmitted in full, so as to inform the recipient of the document whether the document that is being received is being transmitted in full or in part.

The portions P1, P2, and P3 may be transmitted separately one or more times. For this purpose, each has a header H, H2, H3 comprising firstly a parameter specifying that the document is not complete, followed by a definition of the location of the transmitted portion in the tree structure of the complete document.

In this way, a structured document can be enriched and modified over time.

It should be observed that there is no need to transmit the main portion P1 since the location definitions appearing in the headers of the secondary portions enable the processor unit which receives the transmitted secondary portions to determine the location of each received portion in the structure of the document and thus to decode it. In addition, the document can be partitioned in such a manner that the main portion does not contain any payload data, so that the entire document can be reconstituted from the secondary portions and their locations within the document structure.

In addition, the headers H, H2, H3 of the portions P1, P2, P3 may contain information specifying a mode of processing the portion relative to an already transmitted portion associated with the same location in the structure, for example whether the transmitted portion is to replace an already transmitted portion associated with the same location, or whether it should not be taken into account if it already appears in the received document, or indeed whether it should be merged with the already transmitted portion associated with the same location.

Figure 4:
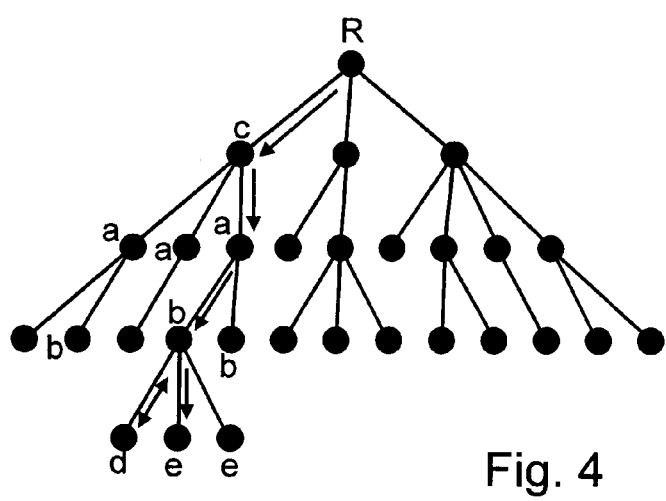
FIG. 4 shows another tree structure illustrating a method of defining the position of a portion of the structure, said portion being transmitted separately from the remainder of the structure.

As shown in FIG. 4, this definition of location may comprise the names of all of the higher nodes going back to the root node R, possibly associated with an order number relative to the higher node. For example, the firstly node of the first node of the third node of the first node attached to the root node (identified in FIG. 4 by a sequence of arrows coming from the root node R) can be referenced as follows:

/c/a[last]/b(1)/d

This notation indicates that it is a node of type "d" connected to the first node of type "b" connected to the last node of type "a" connected to the node of type "c" which is directly connected to the root node R.

Other portions of the document can then be transmitted either by using the absolute definition method (relative to the root node R) as described above, or else, and advantageously, by using a relative definition method. Thus, for example, the third node connected to the same node immediately above the preceding node may be referenced as follows:

../e[2]

This notation states that reference is being made to the second node, which must be of type "e", that is connected to the same node at immediately higher level as referenced by the notation "../". It can be seen that this second method is more compact than the first.

Alternatively, the location of the transmitted portion P2, P3 of the document may be defined merely by means of a reference to the document portion, said reference having already been transmitted in the main portion of P1 of the document, e.g. following the predefined value specifying that the following information subset is not transmitted.

Preferably, the document, or the portions P1, P2, P3 of the document for transmission is/are previously compressed. For this purpose, it is advantageous in each document portion to distinguish between structure information and content information, given that certain document portions need not contain any content information. Thus, in the example of FIGS. 2 and 3, the structure information is constituted by all of the fields except for the value fields Val when these fields are not structured, i.e. when they are not capable of being partitioned into structured subsets of information. In the example of FIG. 2, these are the fields Val of the information subsets 1.1, 1.2.1.1, 1.2.2.1, 1.2.2.2, and 1.3.1, situated at the bottom ends of the branches of the document tree structure.

Compression processing proper consists, for example, in reading the portion of the document that is to be compressed sequentially, in applying an appropriate compression algorithm for processing the structure information, and in applying a compression algorithm adapted to the information type when a non-partitionable field Val appears while reading the document portion. It should be observed that in a compressed document or document portion, the structure information and the content information appears in the same order as in the original, non-compressed document.

It is also possible to apply a statistical compression algorithm, such as Zip.

What is claimed is:

1. A method of handling at least one structured document having a hierarchical structure defined in a structure schema, the structured document comprising a main structured set of information including information subsets, at least one of the information subsets being structured and including information subsets of lower hierarchical level, each information subset being associated in a higher level information set with a respective information type, the structure corresponding to each information type being defined in the structure schema, said method comprising the steps of:

dividing the structured document into structured portions capable of being handled individually, namely a main portion and at least one secondary portion, the main portion containing at least a main set of information, and the secondary portion containing an information subset which is removed from the main set of information, each secondary portion being attached to the main portion or to another secondary portion;

in each information set from which at least one information subset has been removed, allocating a predefined value to the information type of each removed information subset;

transmitting continuously a data stream formed by at least one secondary portion, the step of transmitting comprising at least one step of modifying over time at least one secondary portion, said modifying step consisting of transmitting, while complying with preset periods of time, a plurality of secondary portions associated with a same location in the structure in accordance with at least one predefined rule.

2. The method according to claim 1 wherein, during the step of modifying, the most recently transmitted secondary portion replaces the previously transmitted secondary portion associated with the same location in the structure.

3. The method according to claim 1 further comprising the steps of:

receiving by a recipient the data stream, reading by the recipient at least some received secondary portions, the step of reading comprising at least one step of updating over time the plurality of secondary portions associated with the same location in the structure in accordance with at least one predefined rule.

4. The method according to claim 3 wherein, during the step of updating, the most recently received secondary portion replaces the previously received secondary portion associated with the same location in the structure.

5. The method according to claim 1, wherein the structured document comprises a header which is inserted in each removed portion of the document, said header including a flag whose value specifies whether or not the document is complete.

6. The method according to claim 1, wherein each portion removed from the structured document includes a header containing an information specifying the location of the portion in the hierarchical structure of the document.

7. The method according to claim 6, wherein said information concerning the location of the secondary portion in the hierarchical structure of the structured document specifies a path in said structure, defining a position of the secondary portion in the document.

8. The method according to claim 7, wherein said path is defined in absolute manner relative to the main set of information of the document.

9. The method according to claim 7, wherein with each secondary portion removed from the main document is transmitted separately from the main portion of the document, and said path is defined in relative manner relative to the position of a most recently transmitted secondary portion.

10. The method according to claim 6, wherein each information type allocated to the predefined value, appearing in an information set is followed by a reference to a secondary portion containing the information subset removed from the information set, said information concerning the location of the secondary portion in the hierarchical structure of the document being a reference of said secondary portion.

11. The method according to claim 1, wherein a header of each transmitted secondary portion contains information specifying a processing mode to be applied to said secondary portion relative to an already transmitted secondary portion associated with the same location in the structure.

12. The method according to claim 1, wherein the document has a type belonging to a set comprising SGML, XML, and HTML.

13. The method according to claim 1, wherein the document is transmitted to the recipient by a telecommunication network, the structured schema of the document being known by the recipient.

14. The method according to claim 1, wherein the document is partitioned in such a manner that the main portion does not contain any payload data, so that the entire document is reconstituted from the secondary portions and their locations within the document structure.

15. The method according to claim 1, wherein the data stream comprises the main portion, the step of transmitting comprising at least one step of modifying over time the main portion, said modifying step consisting of transmitting, while complying with preset periods of time, a plurality of main portions associated with a same location in the structure in accordance with at least one predefined rule.

16. The method according to claim 15, wherein the main portion and the secondary portions removed from the main portion, are compressed and then transmitted separately.

17. The method according to claim 16, wherein for each information set and subset containing structure information and content information, the structure information is compressed using a structure information compression algorithm and the content information is compressed using an algorithm adapted to the information type of the content, the structure information and the content information appearing in the compressed secondary portions in the same order as in the corresponding secondary portions when not compressed.

18. The method according to claim 16, wherein for each information set and subset containing structure information and content information, the structure information is compressed using a structure information compression algorithm and the content information is compressed using an algorithm adapted to the information type of the content, the structure information and the content information appearing in the compressed main portion in the same order as in the corresponding main portion when not compressed.

* * * * *